June 4, 1963
G. SIEBOL
3,091,982
METHOD OF SETTING LOCK BOLTS
Original Filed Feb. 17, 1959
2 Sheets-Sheet 1
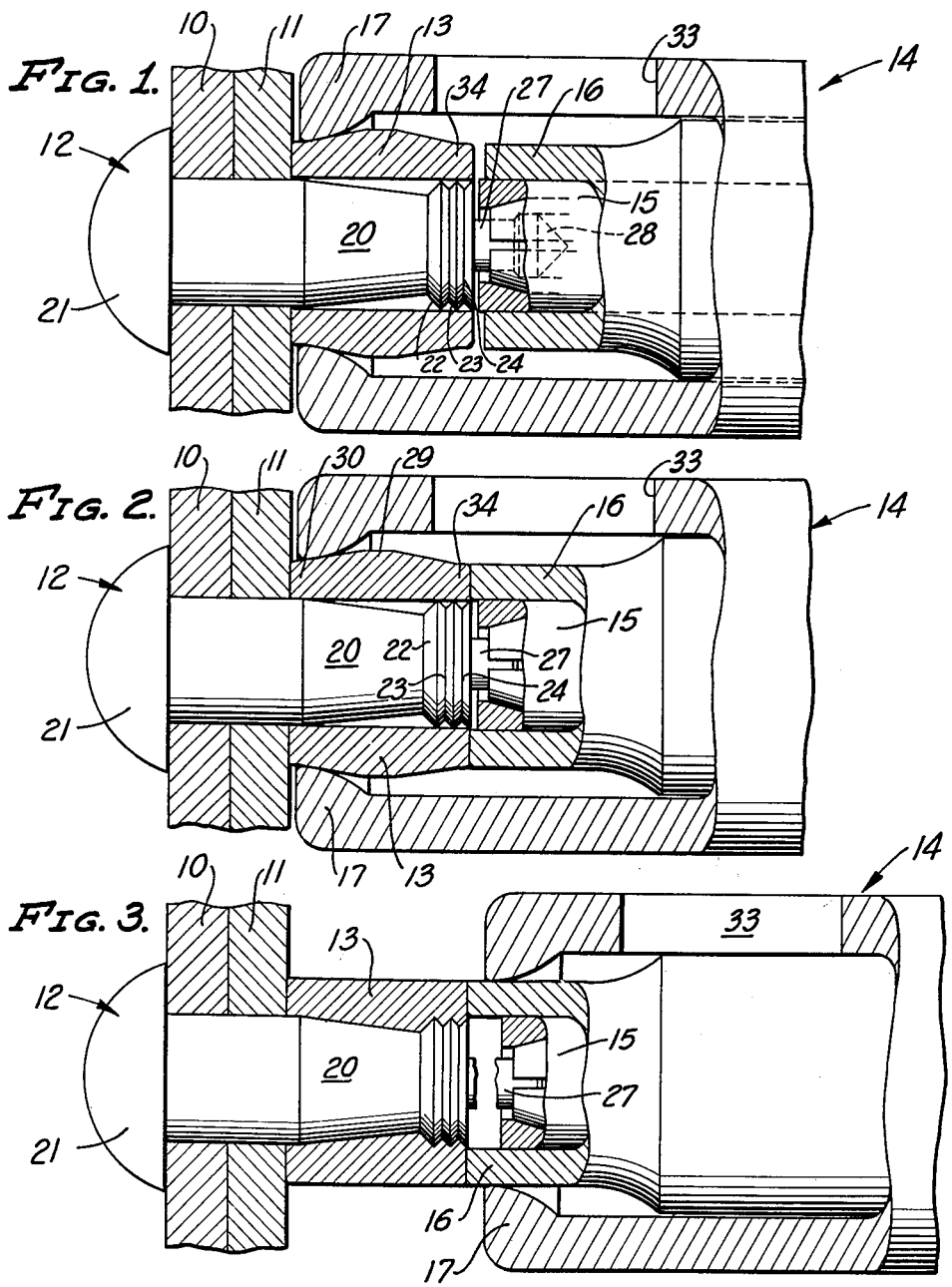
INVENTOR
GEORGE SIEBOL
BY HIS ATTORNEYS.
HARRIS, KIECH, RUSSELL & KERN

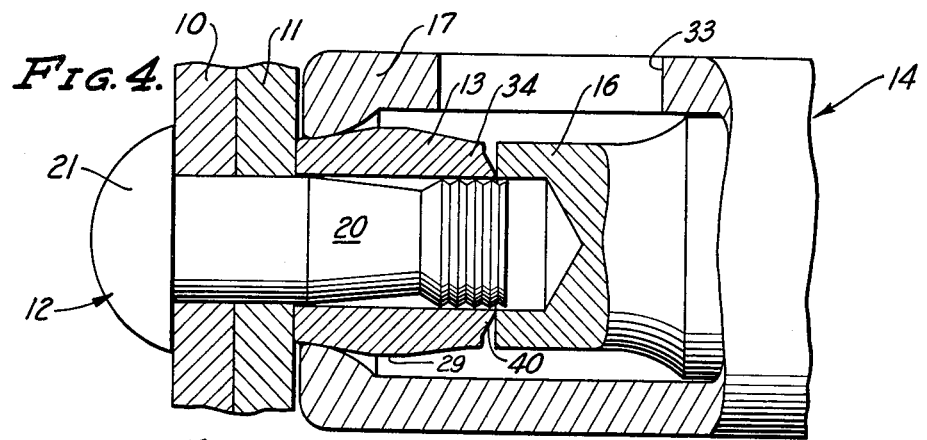
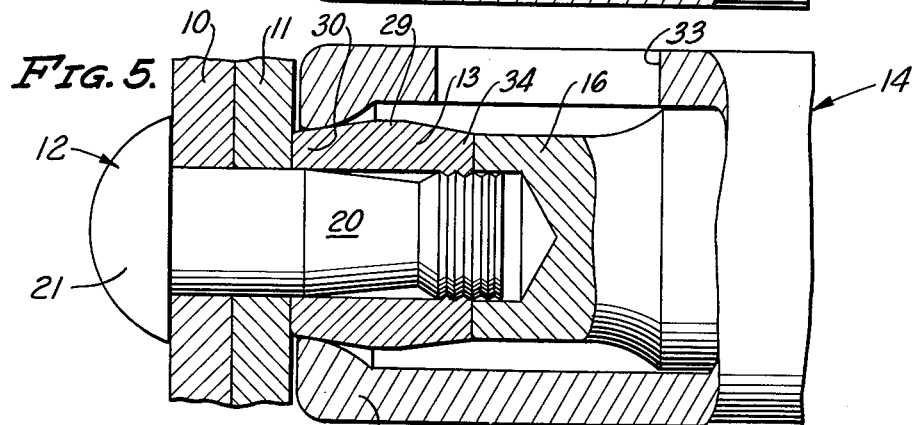
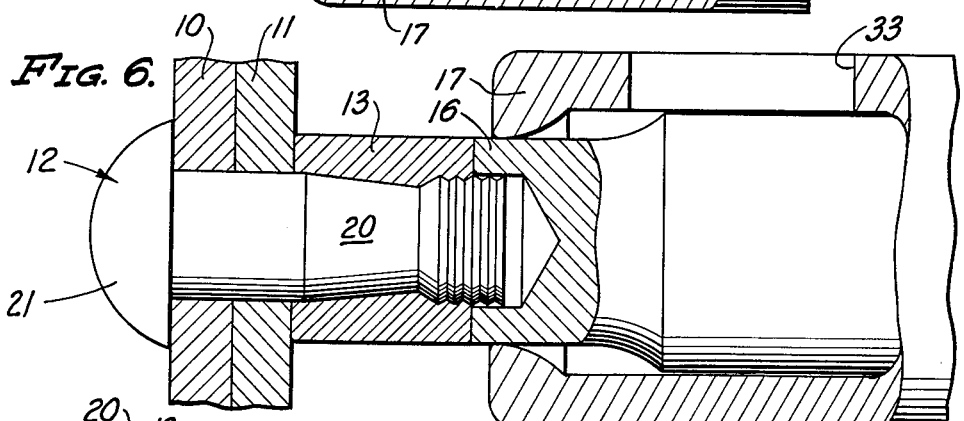
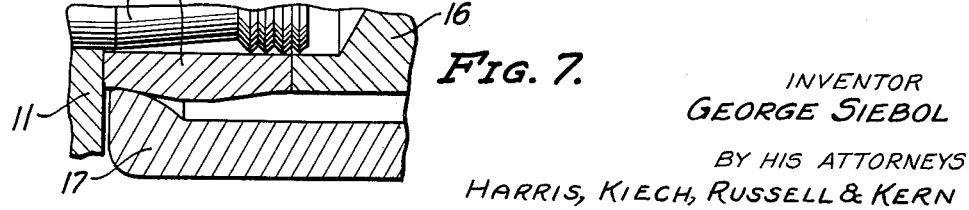

United States Patent Office 3,091,982
Patented June 4, 1963

3,091,982
METHOD OF SETTING LOCK BOLTS
George Siebol, Anaheim, Calif., assignor to Olympic Screw & Rivet Corporation, Downey, Calif., a corporation of California
Original application Feb. 17, 1959, Ser. No. 793,797. Divided and this application Jan. 9, 1962, Ser. No. 165,161
7 Claims. (Cl. 78—46)

This invention relates to fastening devices and, in particular, to lock bolts and to methods of setting same which are improvements upon and substitutes for the presently used methods, such as those shown in the United States patents to Huck, 2,531,048; 2,531,049; and 2,754,703 and Brilmyer, 2,804,798.

This application is a division of my copending application entitled Lock Bolt and Method of Setting, Serial No. 793,797, filed February 17, 1959.

It is an object of the invention to provide a new and improved method of setting lock bolts for joining two or more members having aligned openings. Another object is to provide a method of setting wherein the bolt may be loaded prior to and during swaging, i.e., the bolt is placed in tension with a resultant compression of the members to be joined.

It is an object of the invention to provide a method of setting bolts wherein, in contrast to the prior methods in which the collar material is moved toward the members being joined, the collar is swaged into the stem by pulling the swaging tool over the collar away from the members being joined, thereby providing superior engagement between the stem and collar. Another object is to provide a method of setting wherein excess collar material is pulled over the stem and of the bolt away from the members being joined so that dimensional variations in the collar and/or stem do not adversely affect the quality of the completed fastening. A further object is to provide such a method wherein the swaging force is not limited by the force which will fracture a breakneck on the bolt.

It is an object of the invention to provide a method of setting a lock bolt including applying a compression force to the collar to compress the members being joined together against the head of the bolt and while maintaining the compression force, swaging the collar into the stem by pulling a swaging tool over the collar in a direction away from the aligned members. A further object of the invention is to provide such a method wherein the stem is prestressed by first applying a pulling force to the stem. A further object is to provide such a method wherein the stem is prestressed by first engaging the exposed end of the collar with the stem so that the initial swaging force will produce a tension force in the stem.

The invention also comprises novel details of construction and novel combinations and arrangements of steps, which will more fully appear in the course of the following description. The drawings merely show and the description merely describes preferred embodiments of the present invention which are given by way of illustration or example.

In the drawings:

FIG. 1 is a sectional view of a preferred embodiment of the invention showing the lock bolt in position with a setting gun;

FIG. 2 is a view similar to FIG. 1 showing the bolt partially set;

FIG. 3 is a view similar to FIG. 1 showing the bolt after the setting operation is complete;

FIGS. 4, 5 and 6 are views corresponding to FIGS. 1, 2 and 3, respectively, of an alternative embodiment of the invention; and FIG. 7 is a partial sectional view of another alternative form of the invention.

Turning now to the embodiment of FIGS. 1, 2 and 3, members 10 and 11, which may be metal sheets or the like, are fastened together by a lock bolt comprising a bolt 12 and a collar 13 using a setting tool or gun 14 comprising telescopingly positioned collet 15, anvil 16 and swaging tool 17. The bolt 12 has a stem 20 which is inserted through aligned openings in the members 10, 11 and a head 21 which bears against an outer surface of the aligned members.

A number of annular grooves 22, 23, 24 on the stem 20 provide zones of reduced cross-sectional area into which the collar material is swaged during the setting operation. The number and shape of these grooves are not critical to the invention, although a preferred form for the grooved stem is shown in the drawing. A short extension 27 terminating in a knob 28 is projected axially from the stem and provides means for gripping the stem and applying a tension force thereto.

The collar 13 is slidably positioned over the portion of the stem which projects from the aligned members 10, 11 and is provided with a central portion 29 having a greater outside diameter than an end portion 30 which bears against the members to be joined.

In the setting operation, the collet 15 and anvil 16 of the setting gun are retracted to the right and a collar is fed into the interior of the ring-shaped swaging tool 17 through an opening 33. The collars may be manually positioned within the gun or a feed magazine may be coupled to the opening 33 for automatically supplying collars as desired. Then the open end of the gun is positioned around the stem of the bolt and the collet 15 is advanced to the left to engage the knob 28. Then the anvil 16 is advanced to the left to close the collet around the knob (see FIG. 1). The lock bolt and gun are now in position for setting.

A pulling force is now applied to the stem to place the stem in tension and compress the members 10, 11 against the head of the bolt. This is accomplished by advancing the anvil 16 to engage the end 34 of the collar and pulling or retracting the collet 15. The amount of preload on the bolt can be controlled exactly by controlling the pulling force exerted by the gun. This force is independent of the configuration of the bolt or the collar or the members being joined and may be adjusted to any desired value.

While the desired pulling force is maintained on the stem, the swaging tool 17 is also pulled to the right over the collar to swage the collar material into the grooves of the stem as shown in FIG. 3, the resulting outside diameter of the collar corresponding to the diameter of the opening in the swaging tool. The anvil may now be retracted to the right, permitting the collet to expand and release the knob for removing the setting tool from the set bolt. Alternatively, the pulling force on the collet may be increased to break off the extension 27 as shown in FIG. 3. Ordinarily, the extension will be provided with an annular groove or zone of reduced strength to serve as a breakneck for removing the knob.

The invention as described above provides a lock bolt which may be prestressed to any desired magnitude that may be varied to suit different applications. Furthermore, the swaging force exerted on the collar is independent of this preload and is not dependent upon the maximum strength of any breakneck built into the belt. Furthermore, it should be noted that the preloading extension or knob constitutes only a very small portion of the over-all size of the bolt thereby providing a tremendous waste reduction, and hence, saving in cost of material. The swaging tool travels completely over the collar, insuring swaging of collar material into the stem grooves throughout the length of the collar. Excess collar material is swaged over the end of the collar or the collar length is increased and there is no build-up to limit movement of material.

The embodiment of FIGS. 4, 5 and 6 provides a lock bolt similar to that of FIGS. 1, 2 and 3 while omitting the extension 27 and knob 28 and, hence, completely eliminating material wastage. Corresponding parts in this embodiment are identified by the same reference numerals as in the previous embodiment. An axially extending annular lip 40 is provided at the end 34 of the collar, the lip preferably tapering toward the inner bore of the collar substantially as shown in FIG. 4. The collet 15 is omitted from the setting gun and the annular grooves adjacent the projecting end of the stem serve as the means for gripping the bolt to apply the preload thereto.

In setting this fastener, the stem of the bolt is inserted through the aligned openings of the members being joined and the collar is fed into the gun as in the previous embodiment. After the tool is placed over the exposed end of the stem, the anvil 16 is advanced to engage the lip 40 with the swaging tool 17 engaging the collar 13 as shown in FIG. 4. Then as a pulling force is applied to the swaging tool 17, the lip 40 is first compressed by the anvil 16 into the grooves of the stem as shown in FIG. 5. This provides a grip for the collar on the stem and as the swaging tool 17 is pulled to the right, the collar exerts a tension force on the stem providing the desired preloading on the bolt. After the lip of the collar has been deformed into the grooves of the stem and the anvil 16 is firmly abutted against the end 34 of the collar, the main body of the collar is swaged inwardly by the action of the swaging tool moving over the collar to the position as shown in FIG. 6. In choosing the relative sizes of the stem, collar and swaging tool, it is preferred to dimension the parts so that there is an excess of material to be moved on the collar by the swaging ring over that which can be received by the grooves of the stem to produce some wire drawing or longitudinal extension of the collar and thereby increase the tension force applied to the bolt.

Another alternative form of the invention is shown in FIG. 7 wherein the initial load on the members being fastened is achieved by backing up the head 21 of the bolt in the conventional manner and applying a compression force against the collar 13 via the anvil 16, compressing the members 10, 11 against the head 21. Then while this compression force is maintained, the swaging tool 17 is pulled over the collar 13 to form the collar material into the grooves of the stem, the set fastener having the same appearance as that of FIG. 6.

By way of further explanation, it should be noted that pretensioning of the bolt, i.e., application of a tension or pulling force to the stem, as shown in FIGS. 1–3, is not essential to the setting process, as tensioning of the bolt is produced by pulling the swaging ring over the collar. Collar material is forced into the stem grooves and is extruded or extended along the stem by the swaging tool producing a tension load on the bolt. The magnitude of the load is a function of the sizes of the bolt and collar and can be varied as desired. This tension load on the bolt produced by the pulling on the collar is maintained after the setting tool is removed. This is a distinct advantage over setting methods in which the bolt tension is produced by the setting tool pulling on the bolt while pushing on the collar to swage it in place.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A method of setting a fastener which includes a bolt having a stem for passing through aligned openings of members to be joined and a head for bearing against a surface of the aligned members, and a collar for positioning over the stem and against the opposite surface of the aligned members, including the steps of:
   inserting the stem through the aligned openings of the members to be fastened;
   positioning the collar over the exposed end of the stem;
   applying a compression force to the collar to compress the members together against the head of the bolt;
   and while maintaining this compression force, swaging the collar into the stem by pulling a swaging ring over the collar in a direction away from the aligned members.

2. A method of setting a fastener which includes a bolt having a stem for passing through aligned openings of members to be joined and a head for bearing against a surface of the aligned members, and a collar for positioning over the stem and against the opposite surface of the aligned members, including the steps of:
   inserting the stem through the aligned openings of the members to be fastened;
   positioning the collar over the exposed end of the stem;
   applying a tension force to the stem;
   applying a compression force to the collar to compress the members together against the head of the bolt;
   and while maintaining the tension and compression forces, swaging the collar into the stem by pulling a swaging ring over the collar in a direction away from the aligned members.

3. A method of setting a fastener which includes a a bolt having a stem for passing through aligned openings of members to be joined and a head for bearing against a surface of the aligned members, and a collar for positioning over the stem and against the opposite surface of the aligned members, including the steps of:
   inserting the stem through the aligned openings of the members to be fastened;
   positioning the collar over the exposed end of the stem;
   forming a portion of the collar into gripping engagement with the stem;
   applying a compression force to the collar to compress the members together against the head of the bolt;
   and while maintaining the compression force, pulling a swaging ring over the collar in a direction away from the aligned members for applying a tension force to the stem and swaging the collar into the stem.

4. A method of setting a fastener which includes a bolt having a stem for passing through aligned openings of members to be joined and a head for bearing against a surface of the aligned members, and a collar for positioning over the stem and against the opposite surface of the aligned members, including the steps of:
   inserting the stem through the aligned openings of the member to be fastened;
   positioning the collar over the exposed end of the stem;
   applying a first pulling force to the stem and the reaction force to the exposed end of the collar to stress the bolt in tension and compress the aligned members together;
   and while maintaining the first pulling force, applying a second pulling force to the exterior of the collar and the reaction force to the exposed end thereof to swage the collar into a stem.

5. A method of setting a fastener which includes a bolt having a stem for passing through aligned openings of members to be joined and a head for bearing against a surface of the aligned members, and a collar for positioning over the stem and against the opposite surface of the aligned members, including the steps of:
   inserting the stem through the aligned openings of the member to be fastened;
   positioning the collar over the exposed end of the stem;
   applying a first pulling force to the stem and the reaction force to the exposed end of the collar to stress the bolt in tension and compress the aligned members together;

while maintaining the first pulling force, applying a second pulling force to the exterior of the collar and the reaction force to the exposed end thereof to swage the collar into the stem;

and then increasing said first pulling force to break off the end of the stem.

6. A method of setting a fastener which includes a bolt having a stem for passing through aligned openings of members to be joined and a head for bearing against a surface of the aligned members, and a collar for positioning over the stem and against the opposite surface of the aligned members, including the steps of:

inserting the stem through the aligned openings of the members to be fastened;

positioning the collar over the exposed end of the stem;

applying a compression force to the head of the bolt and the exposed end of the collar to compress the members together;

and while maintaining the compression force, swaging the collar into the stem by pulling a swaging ring over the collar in a direction away from the head.

7. A method of joining a plurality of members by a bolt having a stem for passing through aligned openings in the members to be joined, said bolt having a head for bearing against a surface of the members, and a collar for positioning over the stem and against the opposite surface of the members, comprising the steps of:

inserting the stem through the aligned openings of the members to be joined;

positioning the collar over the exposed end of the stem;

applying an anvil to the free end of the collar to compress the members together against the head of the bolt;

and while maintaining this compression force, swaging the collar into at least one zone of the stem having a reduced cross-sectional area by moving a swaging ring over the collar in a direction away from the members and producing a tension load on the stem.

No references cited.